US012247095B2

(12) United States Patent
Perretta et al.

(10) Patent No.: US 12,247,095 B2
(45) Date of Patent: Mar. 11, 2025

(54) PROCESS FOR PREPARING RANDOM BUTADIENE-ISOPRENE COPOLYMERS HAVING A HIGH CONTENT OF CIS-1,4 UNITS

(71) Applicant: VERSALIS S.P.A., San Donato Milanese (IT)

(72) Inventors: Costantino Perretta, Ferrara (IT); Silvana Di Martino, Ferrara (IT)

(73) Assignee: Versalis S.P.A., San Donato Milanese (IT)

( * ) Notice: Subject to any disclaimer, the term of this patent is extended or adjusted under 35 U.S.C. 154(b) by 937 days.

(21) Appl. No.: 17/058,413

(22) PCT Filed: May 29, 2019

(86) PCT No.: PCT/IB2019/054427
§ 371 (c)(1),
(2) Date: Nov. 24, 2020

(87) PCT Pub. No.: WO2019/229660
PCT Pub. Date: Dec. 5, 2019

(65) Prior Publication Data
US 2021/0198404 A1 Jul. 1, 2021

(30) Foreign Application Priority Data
May 30, 2018 (IT) .................... 102018000005841

(51) Int. Cl.
C08F 236/06 (2006.01)
C08F 2/06 (2006.01)
C08F 4/14 (2006.01)
C08F 4/54 (2006.01)
C08F 236/08 (2006.01)
C08K 3/04 (2006.01)
C08K 3/36 (2006.01)
B60C 1/00 (2006.01)

(52) U.S. Cl.
CPC .............. *C08F 236/06* (2013.01); *C08F 2/06* (2013.01); *C08F 4/14* (2013.01); *C08F 4/545* (2013.01); *C08F 236/08* (2013.01); *C08K 3/04* (2013.01); *C08K 3/36* (2013.01); *B60C 1/0016* (2013.01); *B60C 1/0025* (2013.01)

(58) Field of Classification Search
CPC .... C08F 2/06; C08F 4/14; C08F 4/545; C08F 236/06; C08F 236/08
See application file for complete search history.

(56) References Cited

U.S. PATENT DOCUMENTS

| 7,115,693 | B2 | 10/2006 | Laubry | |
| 8,664,344 | B2* | 3/2014 | Viola | C08F 36/06 526/138 |
| 2003/0187162 | A1 | 10/2003 | Rachita | |
| 2004/0186252 | A1 | 9/2004 | Hsu et al. | |
| 2005/0004333 | A1 | 1/2005 | Laubry | |
| 2005/0137338 | A1 | 6/2005 | Halasa | |
| 2005/0222348 | A1 | 10/2005 | Ricci | |
| 2011/0112261 | A1 | 5/2011 | Viola et al. | |
| 2012/0264897 | A1 | 10/2012 | Ruehmer | |
| 2012/0305153 | A1 | 12/2012 | Zhao | |
| 2017/0233504 | A1* | 8/2017 | Yamagata | B60C 1/00 526/127 |

FOREIGN PATENT DOCUMENTS

| CN | 104130350 A | 11/2014 |
| DE | 10032876 A1 | 9/2001 |
| EP | 0629640 A1 | 12/1994 |
| JP | 2011-516642 A | 5/2011 |
| RU | 2301236 C2 | 6/2007 |
| RU | 2467019 C1 | 11/2012 |
| RU | 2618531 C2 | 5/2017 |
| WO | 2013/127448 A1 | 9/2013 |
| WO | 2016-027402 A1 | 2/2016 |

OTHER PUBLICATIONS

Quirk et al., Polymer 41 (2000), 5903-5908.*
Russian Office Action dated Mar. 29, 2023 from corresponding Russian Patent Application No. 2020140682/04, 11 pages.
Japanese Office Action dated Mar. 28, 2023 from corresponding Japanese Patent Application No. 2020-566209, 9 pages.
Iranian Office Action dated May 5, 2021 for Iranian Appl. No. 139950140003007615.
International Search Report dated Aug. 2, 2019 for PCT application No. PCT/IB2019/054427.
Written Opinion dated Aug. 2, 2019 for PCT application No. PCT/IB2019/054427.
Chinese First Office Action dated Jan. 6, 2023 from corresponding Chinese Patent Application No. 201980036449.4, 18 pages.
India Office Action dated May 4, 2022 for Indian Appl. No. 202017051189.

(Continued)

*Primary Examiner* — Vu A Nguyen
(74) *Attorney, Agent, or Firm* — Ruggiero McAllister & McMahon LLC

(57) ABSTRACT

Process for preparing a random butadiene-isoprene copolymer having a high content of cis-1,4 units comprising copolymerizing butadiene and isoprene, in the presence of at least one organic solvent, and a catalytic system prepared in situ comprising: ($a_1$) at least one neodymium carboxy late soluble in said organic solvent, containing a variable amount of water, the H2O/Nd molar ratio being between 0.001/1 and 0.50/1: ($a_2$) at least one aluminum alkyl compound: ($a_3$) at least one aluminum alkyl compound containing at least one halogen atom. The random butadiene-isoprene copolymer having a high content of cis-1.4 units obtained from the abovementioned process may be advantageously used in a number of applications ranging from the modification of plastics [for example, obtainment of high impact polystyrene (HIPS)], to the production of tires, in particular the production of tire treads and/or of tire sidewalls.

13 Claims, No Drawings

(56) References Cited

OTHER PUBLICATIONS

Indian Office Action dated Nov. 6, 2023 from corresponding Indian Patent Application No. 202017051189, 4 pages.
Ferreira, C. N. Mello, I. L., & Coutinho, F.; "Influence of the chlorinating agent of neodymium based catalysts and CI: Nd molar ratio on butadiene polymerization"; Polimeros, 19, 138-142; Jun. 30, 2009 (Machine translation).
Quirk, R. P., Kells, A. M., Yunlu, K., & Cuif, J. P.; "Butadiene polymerization using neodymium versatatebased catalysts: catalyst optimization and effects of water and excess versatic acid"; Polymer, 41(15), Apr. 4, 2000, ;pp. 5903-5908; (Machine translation).

* cited by examiner

PROCESS FOR PREPARING RANDOM BUTADIENE-ISOPRENE COPOLYMERS HAVING A HIGH CONTENT OF CIS-1,4 UNITS

CROSS-REFERENCE TO RELATED APPLICATIONS

The present application claims benefit of PCT Application No. PCT/IB2019/054427, filed May 29, 2019, which claims benefit of Italy Application No. 102018000005841, filed May 30, 2018, both of which are incorporated herein by reference in their entireties.

BACKGROUND OF THE DISCLOSURE

1. Field of the Disclosure

This invention relates to a process for preparing a random butadiene-styrene copolymer having a high content of cis-1,4 units.

2. Description of the Prior Art

Random, block or "tapered" butadiene-isoprene copolymers, as well as the processes for obtaining them, are known in the art.

For example, American patent U.S. Pat. No. 4,032,459 relates to a lubricating composition comprising, as an agent able to improve the viscosity index, a hydrogenated butadiene-isoprene copolymer having a 1,4 configuration of between 20% and 55% and the weight ratio between butadiene and isoprene of between approximately 10:90 and approximately 70:30. Said copolymer may be selected from random, block or "tapered" butadiene-isoprene copolymers which may be obtained by anionic copolymerization, in the presence of a hydrocarbon solvent and a lithium-based catalyst.

American patent U.S. Pat. No. 4,413,098 relates to an isoprene-butadiene copolymer with improved processability and the following characteristics: (1) a microstructure of the butadiene part having from 70% to 90% of 1,4-trans units and from 2% to 8% of vinyl units; (2) an isoprene content of between 3% by weight and 25% by weight; (3) a styrene content of between 0% by weight and 30% by weight; (4) a Mooney viscosity of between 30 and 150; (5) a molecular weight distribution, $M_w/M_n$, of between 1.2 and 3.5; (6) said copolymer, in the unelongated state, if analyzed by means of differential scanning calorimeter (DSC) does not show a melting point. Said copolymer may be block or random and may be obtained by copolymerization in the presence of an organic solvent and an initiator which may be selected from (i) organic compounds of a metal belonging to Group IIA of the Periodic Table of Elements and (ii) a compound selected from the group consisting of an organic compound based on lithium, a mixture of an organic compound based on lithium and an organic compound based on aluminum, an organic compound of magnesium. The abovementioned copolymer is said to be advantageously used in the production of tires, for example in the production of tread and carcass.

American patent U.S. Pat. No. 5,405,927 relates to an isoprene-butadiene copolymer, which may be advantageously used in the production of truck tire treads, comprising repetitive units deriving from approximately 20% by weight to approximately 50% by weight from isoprene and from approximately 50% by weight to approximately 80% by weight from 1,3-butadiene, in which the repetitive units derived from isoprene and 1,3-butadiene are essentially in random order, in which from approximately 3% to approximately 10% of the repetitive units are polybutadiene units having a 1,2 structure, in which approximately 50% to approximately 70% of said repetitive units are polybutadiene units having a 1,4 structure, in which approximately 1% to approximately 4% of said repetitive units are polyisoprene units having a 3,4 structure, in which approximately 25% to approximately 40% of said repetitive units are polyisoprene units having a 1,4 structure, in which said copolymer has a glass transition temperature (Tg) of between −90° C. and −75° C., in which said copolymer has a Mooney viscosity of between approximately 55 and approximately 140, and in which more than 60% of the isoprene present in said copolymer is present in blocks formed by a number of repetitive units of less than or equal to 3.

American patent U.S. Pat. No. 5,612,436 relates to an isoprene-butadiene diblock copolymer with an excellent combination of properties, which is advantageously used in the production of truck tire treads, comprising a butadiene block and an isoprene-butadiene block, in which said butadiene block has an average molecular weight of between approximately 25000 and approximately 350000, in which said isoprene-butadiene block has an average molecular weight of between approximately 25000 and approximately 350000, in which said isoprene-butadiene block copolymer essentially has a glass transition temperature (Tg) of between approximately −100° C. and approximately −70° C., in which said isoprene-butadiene block copolymer has a Mooney ML-4 viscosity at 100° C. of between approximately 50 and approximately 140, and in which the repetitive units deriving from the isoprene and from the 1,3-butadiene in said isoprene-butadiene diblock copolymer are essentially in random order. Said isoprene-butadiene diblock copolymer is obtained by a two-stage process comprising a first-stage in which a polymerization of 1,3-butadiene in the presence of an organic solvent, a lithium-based initiator and at least one polar modifier in order to obtain a living polybutadiene block takes place; and a second stage in which said living polybutadiene block is copolymerized with isoprene in the presence of an organic solvent and at least one polar modifier.

American patent U.S. Pat. No. 6,204,320 relates to an isoprene-butadiene liquid polymer essentially consisting of repetitive units deriving from approximately 5% by weight to approximately 95% by weight from isoprene and from approximately 5% by weight to approximately 95% by weight from 1,3-butadiene, in which the repetitive units deriving from isoprene and from 1,3-butadiene are essentially random, in which said liquid isoprene-butadiene polymer has a low number average molecular weight of between approximately 3000 and approximately 50000 and in which said liquid isoprene-butadiene polymer has a glass transition temperature (Tg) of between approximately −50° C. and approximately 20° C. Said liquid isoprene-butadiene polymer may be prepared by polymerization in the presence of an organic solvent, a lithium-based initiator and a polar modifier. The abovementioned liquid isoprene-butadiene polymer is said to be advantageously used in the production of treads for high performance car tires, including racing cars, which exhibit excellent dry traction and durability characteristics.

American patent U.S. Pat. No. 3,772,256 relates to a process for preparing a butadiene-isoprene copolymer comprising placing butadiene and isoprene in contact in an organic solvent with a catalyst free of ethers obtained by mixing magnesium diphenyl and titanium: tetraiodate at a temperature of between −10° C. and 90° C., said butadiene-isoprene copolymer comprising 80-99 moles percent of butadiene and 40-90 moles percent of isoprene in cis-1,4 configuration, the isoprene content being between 5 moles percent and 95 moles percent and the butadiene content being between 95 moles percent and 5 moles percent. The abovementioned butadiene-isoprene copolymer is said to be advantageously use in vulcanizable elastomer compositions capable of yielding vulcanizable products with low hysteresis, good cold properties and good wear resistance and therefore being particularly useful in the production of tires.

European patent application EP 629 640 relates to a process for preparing a butadiene-isoprene copolymer comprising isoprene and 1,3-butadiene copolymers in the presence of an organic solvent and in the presence of a catalytic system obtained by means of the following stages in sequence: (1) mixing (a) an aluminum hydride, (b) a compound selected from the group consisting of aliphatic or cycloaliphatic alcohols, aliphatic or cycloaliphatic thiols, trialkyl or triaryl silanols, and (c) optionally, 1,3-butadiene in an organic solvent in order to obtain a modified aluminum hydride; (2) adding an organometallic compound containing a metal belonging to Group III-B of the Periodic System (preferably, neodymium) in order to obtain a modified aluminum hydride containing a metal belonging to Group III-B of the Periodic System; and (3) adding a compound containing at least one labile halogen atom. The abovementioned butadiene-isoprene copolymer is said to be random and "non-tapered" and to be advantageously used in the production of sidewalls for truck tires.

American patent U.S. Pat. No. 7,115,639 relates to a process for preparing a butadiene-isoprene copolymer, said process comprising copolymerizing butadiene and isoprene in the presence of a catalytic system comprising: (a) a monomer of a conjugated diene; (b) an organic salt of phosphoric acid with at least one rare earth metal; (c) an aluminum alkyl compound as an alkylating agent having formula $AlR_3$ or $HAlR_2$ in which R is an alkyl group; and (d) a halide of an aluminum alkyl compound as a halogen donor; said salt being in suspension in at least one saturated aliphatic or alicyclic hydrocarbon solvent included in said catalytic system, the molar ratio between said alkylating agent and said organic salt of phosphoric acid with at least one rare earth metal being between 1 and 8, and in which copolymerization is optionally carried out in the presence of an inert hydrocarbon solvent. The butadiene-isoprene copolymer obtained is said to have a high content of cis-1,4 units.

However, the abovementioned copolymerization processes for preparing butadiene-isoprene copolymers do not always give the desired results, for example, in terms of random configuration and/or high content of cis-1,4 units for both monomers, i.e. butadiene and isoprene, and/or molecular weight distribution. In addition, in some of the abovementioned processes pre-formed catalysts are used which therefore require longer process times and, consequently, increased process costs.

SUMMARY OF THE DISCLOSURE

More specifically the present invention relates to a process for preparing a random butadiene-isoprene copolymer having a high content of cis-1,4 units comprising copolymerizing butadiene and isoprene, in the presence of at least one organic solvent, and a catalytic system prepared in situ comprising: ($a_1$) at least one neodymium carboxylate soluble in said organic solvent, containing a variable amount of water, the molar $H_2O/Nd$ ratio being between 0.001/1 and 0.50/1; ($a_2$) at least one aluminum alkyl compound; ($a_3$) at least one aluminum alkyl compound containing at least one halogen atom.

The random butadiene-isoprene copolymer having a high content of cis-1,4 units obtained from the abovementioned process may be advantageously used in a number of applications ranging from the modification of plastics [for example, obtainment of high impact polystyrene (HIPS)], to the production of tires, in particular the production of tire treads and/or tire sidewalls.

The random butadiene-isoprene copolymer having a high content of cis-1,4 units obtained from the abovementioned process may also be advantageously used in vulcanizable elastomer compositions.

A further object of the present invention is therefore a vulcanizable elastomer composition comprising at least one random butadiene-isoprene copolymer having a high content of cis-1,4 units obtained from the abovementioned process.

Said vulcanizable elastomer composition may be advantageously used in the production of vulcanized products, in particular in the production of tires, more particularly in the production of tire treads and/or tire sidewalls.

Another object of the present invention is a random butadiene-isoprene copolymer having a high content of cis-1,4 units obtained from the abovementioned process, said copolymer having the characteristics reported below.

The Applicant therefore set itself the problem of finding a process for preparing a random butadiene-isoprene copolymer having a high content of cis-1,4 units. More specifically, the Applicant set itself the problem of finding a process for preparing a random butadiene-isoprene copolymer having a high content of cis-1,4 units for both monomers, i.e. butadiene and isoprene, a narrow molecular weight distribution and a specific isoprene randomization index (calculated as shown below).

The Applicant has now found the preparation of a random butadiene-isoprene copolymer having a high content of cis-1,4 units may be advantageously carried out through a process involving copolymerizing butadiene and isoprene in the presence of at least one organic solvent and a catalytic system prepared in situ comprising: ($a_1$) at least one neodymium carboxylate soluble in said organic solvent, containing a variable amount of water, the molar $H_2O/Nd$ ratio being between 0.001/1 and 0.50/1; ($a_2$) at least one aluminum alkyl compound; ($a_3$) at least one aluminum alkyl compound containing at least one halogen atom. Said process allows to obtain a random butadiene-isoprene copolymer having a high content of cis-1,4 units for both monomers, i.e. butadiene and isoprene, a narrow molecular weight distribution and a specific isoprene randomization index (calculated as reported below). In addition, the weight ratio between butadiene and isoprene bound in the random butadiene-isoprene copolymer having a high content of cis-1,4 units obtained may also be controlled through said process. Furthermore, said process allows to obtain a random butadiene-isoprene copolymer having a high content of cis-1,4 units which may be advantageously used in a number of applications ranging from the modification of plastics [for example, obtainment of high impact polystyrene (HIPS)], to the production of tires, in particular the production of tire treads and/or tire sidewalls.

Thus the object of the present invention is a process for preparing a random butadiene-isoprene copolymer having a high content of cis-1,4 units comprising copolymerizing butadiene and isoprene in the presence of at least one organic solvent and a catalytic system prepared in situ comprising:

(a₁) at least one neodymium carboxylate which is soluble in said organic solvent, containing a variable amount of water, the H₂O/Nd molar ratio being between 0.001/1 and 0.50/1;

(a₂) at least one aluminum alkyl compound;

(a₃) at least one aluminum alkyl compound containing at least one halogen atom.

For the purpose of the present description and of the following claims, the definitions of the numerical ranges always include the extremes unless otherwise specified.

DETAILED DESCRIPTION OF THE DISCLOSURE

For the purpose of present description and of the following claims, the term "comprising" also includes the terms "which essentially consists of" or "which consists of".

The relative amount of butadiene and isoprene that may be copolymerized according to the process object of the present invention may vary over a wide range. For example, the monomer composition fed to the copolymerization reactor may contain from approximately 1% by weight to approximately 99% by weight of butadiene and from approximately 1% by weight to approximately 99% by weight of isoprene. In many cases, the monomer composition fed to the copolymerization reactor may contain from approximately 10% by weight to approximately 90% by weight of butadiene and from approximately 10% by weight to approximately 90% by weight of isoprene, preferably, the monomer composition fed to the copolymerization reactor may contain from approximately 50% by weight of butadiene to approximately 50% by weight of isoprene.

According to a preferred embodiment of the present invention, said butadiene and said isoprene may be present in total amount (i.e. amount of butadiene+amount of isoprene) of between 5% by weight and 40% by weight, preferably between 10% by weight and 25% by weight, with respect to to the total weight of the organic solvent. Preferably, previously distilled butadiene and isoprene are used, optionally treated with molecular sieves and/or activated alumina. Preferably 1,3-butadiene and isoprene (2-methyl-1,3-butadiene) are used.

According to a preferred embodiment of the present invention, said organic solvent may be selected, for example, from: saturated aliphatic hydrocarbons such as, for example, butane, n-pentane, n-hexane, n-heptane, or mixtures thereof; saturated cycloaliphatic hydrocarbons such as, for example, cyclohexane, cyclopentane, or mixtures thereof; monoolefins such as, for example, 1-butene, 2-butene, or mixtures thereof; halogenated hydrocarbons such as, for example, methylene chloride, chloroform, carbon tetrachloride, trichloroethylene, perchloroethylene, 1,2-dichloroethane, chlorobenzene, bromobenzene, chlorotoluene, or mixtures thereof. Preferably, said organic solvent may be selected from saturated aliphatic hydrocarbons, more preferably from: n-hexane; a mixture comprising 35% by weight with respect to the total weight of the mixture of n-hexane and 65% by weight with respect to the total weight of the mixture of a mixture comprising n-hexane isomers, aliphatic compounds and cycloaliphatic compounds. Preferably, said organic solvent must be as anhydrous as possible and free from proton-generating substances. Distillation, followed if necessary by treatment on alumina beds and 3A or 4A molecular sieves is sufficient to obtain a suitable solvent.

According to a preferred embodiment of the present invention, the neodymium carboxylate (a₁) may be neodymium versatate [Nd(versatate)₃]. Preferably, said neodymium versatate [Nd(versatate)₃] contains free versatic acid, the free versatic acid/Nd molar ratio being less than 2, more preferably less than 0.5.

According to a preferred embodiment of the present invention, said neodymium carboxylate may be used in amount of between 0.1 mmol and 10 mmol, preferably between 0.5 mmol and 5 mmol, per 1000 g of monomers (butadiene+isoprene) being polymerized. It should be noted that when the amount of neodymium carboxylate is less than 0.1 mmol, the reaction rate is reduced to unacceptable values, while when the amount of neodymium carboxylate is greater than 10 mmol, the catalyst concentration is too high and the average weight molecular weight ($M_w$) of the polymer obtained is too low for the uses described above.

According to a preferred embodiment of the present invention, the aluminum alkyl compound (a₂) may be selected, for example, from compounds having general formula (I) or (II):

$$Al(R^1)_3 \quad (I)$$

$$AlH(R^1)_2 \quad (II)$$

in which $R^1$ represents a linear or branched $C_1$-$C_{10}$ alkyl group.

Specific examples of alkyl aluminum compounds having general formula (I) or (II) that may be advantageously used for the purpose of the present invention are: trimethyl aluminum, triethyl aluminum (TEA), tri-n-propyl aluminum, tri-isopropyl aluminum, tri-n-butyl aluminum, tri-isobutyl aluminum, tri-pentyl aluminum, tri-hexyl aluminum, tri-cyclohexyl aluminum, tri-octyl aluminum, diethyl aluminum hydride, di-n-propyl aluminum hydride, di-n-butyl aluminum hydride, di-isobutyl aluminum hydride (DIBAH), dihexyl aluminum hydride, di-iso-hexyl aluminum hydride, or mixtures thereof. Triethyl aluminum (TEA), tri-isobutyl aluminum, diethyl aluminum hydride, di-isobutyl aluminum hydride (DIBAH) are preferred; di-isobutyl aluminum hydride (DIBAH) is particularly preferred. According to a preferred embodiment of the present invention, said aluminum alkyl compound containing at least one halogen atom (a₃) may be selected, for example, from compounds having general formula (III):

$$AlX_n R^2_{3-n} \quad (III)$$

in which $R^2$ represents a linear or branched $C_1$-$C_{10}$ alkyl group, X represents a halogen atom such as, for example, chlorine, bromine, fluorine, iodine, preferably chlorine, n is 1 or 2.

Specific examples of alkyl aluminum compounds containing at least one halogen atom (a₃) that may be advantageously used for the purpose of the present invention are: diethyl aluminum chloride (DEAC), ethyl aluminum dichloride, ethyl aluminum sesquichloride (EASC), di-isobutyl aluminum chloride (DIBAC), or mixtures thereof. Diethyl aluminum chloride (DEAC), ethyl aluminum sesquichloride (EASC) are preferred; diethyl aluminum chloride (DEAC) is particularly preferred.

According to a preferred embodiment of the present invention, the molar ratio between the aluminum alkyl compound (a₂) and neodymium carboxylate (a₁) may be between 1/1 and 30/1, preferably between 1/1 and 10/1.

According to a preferred embodiment of the present invention, the molar ratio between the halogen present in the alkyl aluminum compound containing at least one halogen atom ($a_3$) and neodymium carboxylate ($a_1$) may be between 2.5/1 and 5.5/1, preferably between 2.8/1 and 5.2/1.

It should be noted that the above molar ratio between the halogen present in the aluminum alkyl compound containing at least one halogen atom (as) and neodymium carboxylate ($a_1$), influences the molecular weight distribution and makes it possible to obtain, within the claimed range, random butadiene-isoprene copolymers having a narrow molecular weight distribution. Outside this range, in fact, the polydispersion index corresponding to the ratio between the weight average molecular weight ($M_w$) and the numerical average molecular weight ($M_n$), (i.e. the ratio $M_w/M_n$), reaches values higher than 3.2.

According to a preferred embodiment of the present invention, the aluminum compound containing at least one halogen atom ($a_3$) may be used in such amount that the ratio between the halogen present in said compound ($a_3$) and the aluminum alkyl compound ($a_2$) is between 0.4 and 5, more preferably between 0.5 and 2.0.

The abovementioned process may be carried out under adiabatic conditions, or isothermally.

According to a preferred embodiment of the present invention, said process may be carried out at a temperature of between 20° C. and 150° C., preferably between 40° C. and 120° C.

According to a preferred embodiment of the present invention, said process may be carried out at a pressure of between 1 bar and 10 bar, preferably between 3 bar and 7 bar.

As far as copolymerization times are concerned, they vary according to the operating conditions and in any case, merely by way of example, during copolymerization substantially complete conversion of butadiene and isoprene is obtained in a polymerization time of between 30 minutes and 4 hours.

The process object of the present invention may be carried out either discontinuously ("batch"), or continuously, preferably continuously.

Generally, when a batch reactor is used, the desired amount of neodymium carboxylate ($a_1$) is added to the mixture formed by the organic solvent, monomers (butadiene+isoprene), aluminum alkyl compound ($a_2$), aluminum alkyl compound containing at least one halogen atom ($a_3$).

Alternatively, the aluminum containing at least one halogen atom ($a_3$) may be added as the last ingredient in the copolymerization mixture formed by the organic solvent, the monomers (butadiene+isoprene), neodymium carboxylate ($a_1$) and the aluminum alkyl compound ($a_2$).

Preferably, in the processes according to the present invention, neodymium carboxylate ($a_1$) is added to the reaction mixture as the last ingredient.

Where a continuous process is used, the neodymium carboxylate ($a_1$) is preferably fed directly into the copolymerization reactor itself, avoiding any contact with the aluminum alkyl compound ($a_2$) and the aluminum alkyl compound containing at least one halogen atom ($a_3$).

In the continuous process, a single copolymerization reactor or several reactors in series may be used. Preferably, 2 or 3 copolymerization reactors are used in series.

At the end of copolymerization, the butadiene-isoprene copolymer obtained may be recovered by means of techniques known in the art. For example, the polymer solution obtained may be fed to a vessel containing boiling water through the introduction of steam in order to eliminate the residual reaction solvent and to form a coagulum that may be first pressed in a cold calender and then dried completely in a calender with rollers at 80° C. to obtain a random butadiene-isoprene copolymer; alternatively, the polymer solution obtained may be fed to a "stripper" to remove residual reaction solvent, and the random butadiene-isoprene copolymer obtained may then be dried in an oven, under vacuum, at 40° C.-50° C.; alternatively, the polymer solution obtained may be fed to a "stripper" to remove residual reaction solvent and the random butadiene-isoprene copolymer obtained may then be dried by passing through one or more extruders in series: more details may be found in the following examples.

As mentioned above, the random butadiene-isoprene copolymer having a high content of cis-1,4 units obtained by the abovementioned process is a further object of the present invention.

Consequently the present invention also relates to a random butadiene-isoprene copolymer having a high content of cis-1,4 units having the following characteristics:
cis-1,4-butadiene unit content greater than or equal to 92%, preferably between 95% and 99%;
cis-1,4-isoprene unit content greater than or equal to 92%, preferably between 95% and 99,95%;
Randomization Index (R.I.) of the isoprene calculated according to the following equation:

$$R.I.=[(BI+IB)/2]/\text{total moles of bound isoprene}$$

in which BI and IB are the amounts of butadiene-isoprene and isoprene-butadiene dyads, respectively, present in the random butadiene-isoprene copolymer having a high content of cis-1,4 units, of between 0.5 and 1, preferably between 0.6 and 0.9;
a weight ratio (% by weight) of bound butadiene and bound isoprene of between 99:1 and 40:60, preferably between 90:10 and 45:55;
a single glass transition temperature (Tg), an index of the effective randomization of both comonomers, of between −107° C. and −65° C., preferably between −105° C. and −85° C.;
a Mooney viscosity (ML1+4@100° C.) of between 30 and 70, preferably between 35 and 65;
a molecular weight distribution, indicated as the polydispersion index corresponding to the ratio between the weight average molecular weight ($M_w$) and the numerical average molecular weight ($M_n$), (i.e. the ratio $M_w/M_n$), of between 2.0 and 3.2.

As mentioned above, the random butadiene-isoprene copolymer having a high content of cis-1,4 units obtained according to the process object of the present invention, may be advantageously used in a number of applications ranging from the modification of plastics [for example, obtainment of high impact polystyrene (HIPS)], to the production of tires, in particular the production of tire treads and/or of tire sidewalls.

In addition, as mentioned above, the random butadiene-isoprene copolymer having a high content of cis-1,4 units obtained according to the process object of the present invention, may also be advantageously used in vulcanizable elastomer compositions. For example, a random butadiene-isoprene copolymer having a high content of cis-1,4 units may be used in a mixture with at least one filler, such as, for example, silica and/or carbon black, as a component of vulcanizable elastomer compositions for preparing tires, in particular tire treads and/or tire sidewalls.

Therefore, a further object of the present invention is a vulcanizable elastomer composition comprising at least one random butadiene-isoprene copolymer having a high content of cis-1,4 units obtained as described above, at least one filler selected from silica, carbon black, or mixtures thereof, and at least one vulcanizing agent. Preferably, said filler may be present in said vulcanized elastomer composition in amount of between 5 phr and 500 phr.

Said vulcanizable elastomer composition may include, in addition to said random butadiene-isoprene copolymer having a high content of cis-1,4 units, other elastomer (co) polymers such as, for example, natural rubber (NR), styrene-butadiene copolymers (SBR). However, it is preferable that said vulcanizable elastomer composition comprises from 10% by weight to 65% by weight of said random butadiene-isoprene copolymer having a high content of cis-1,4 units, with respect to to the total weight of the elastomers present in said vulcanizable elastomer composition.

For the purpose of the present invention and of the following claims the term "phr" means the parts by weight of a given component per 100 parts by weight of (co) polymer(s) present in the vulcanizable elastomer composition.

Said vulcanizing agent may be selected, for example, from soluble or insoluble elemental sulfur, or sulfur donors, or mixtures thereof.

Sulfur donors are, for example, dimorpholyl disulfide (DTDM), 2-morpholino-dithiobenzothiazole (MBSS), caprolactam disulfide, dipentamethylenethiuram tetrasulfide (DPTT), tetramethylthiuram disulfide (TMTD), or mixtures thereof.

If the vulcanizing agent is selected from sulfur or sulfur donors, it may also be advantageous to use other additives such as, for example, dithiocarbamates, thiurams, thiazoles, sulfenamides, xanthogenates, guanidine derivatives, caprolactams, thiourea derivatives or mixtures thereof, in order to increase the vulcanizing yield.

In said vulcanizable elastomer composition, said sulfur, and/or said sulfur donors, and/or said other additives reported above, if present, are generally present in amount of between 0.05 phr and 10 phr, preferably between 0.1 phr and 8 phr.

Other compounds may be added to the vulcanizable elastomer compositions object of the present invention, such as, for example, saturated or unsaturated organic fatty acids or their zinc salts; polyalcohols; amino alcohols (e.g., triethanolamine); amines (e.g., dibutylamine, dicyclohexylamine, cyclohexyl-ethylamine); polyether amines; or mixtures thereof.

Vulcanization inhibitors such as, for example, N-cyclohexylthiophthalimide (PVI), N,N'-dinitrosopentamethylenetetramine (DNPT), phthalic anhydride (PTA), diphenylnitrosamine, or mixtures thereof, may also be added.

In addition to the abovementioned vulcanizing agents and/or the other compounds reported above, the vulcanizable elastomer composition object of the present invention, may comprise other additives normally used in vulcanizable elastomer compositions and known to those skilled in the art such as, for example, other fillers, filler activators, ozone protective agents, ageing inhibitors, antioxidants, processing aids, extender oils, plasticizers, reinforcing materials, mould releasing agents.

Other fillers that may be used for the purpose of the present invention are, for example: barium sulfate, titanium dioxide, zinc oxide, zinc carbonate, lead oxide, calcium oxide, calcium carbonate, magnesium oxide, aluminum oxide, iron oxide, aluminum hydroxide, magnesium hydroxide, aluminum silicates, diatomaceous earth, talc, kaolin, bentonite, carbon nanotubes, Teflon® (preferably in powder form), silicates, or mixtures thereof. The total amount of fillers is however between 5 phr and 500 phr.

The filler activators that may be used for the purpose of the present invention are, for example: organic silanes such as, for example, vinyltrimethyloxysilane, vinyldimetoxymethylsilane, vinyltriethoxysilane, vinyltris-(2-methoxyethoxy) silane, N-cyclohexyl-3-aminopropyl-trimethoxysilane, 3-aminopropyltrimethoxysilane, methyltrimethoxysilane, methyltriethoxysilane, dimethyldimethoxysilane, dimethyldiethoxysilane, trimethoxysilane, isooctyltriethoxysilane, hexadecyltrimethoxysilane, (octadecyl)-methyldimethoxysilane, or mixtures thereof.

Additional filler activators are, for example, surfactant substances such as triethanolamine, ethylene glycols, or mixtures thereof. The amount of filler activators is generally between 0 phr and 10 phr.

Another object of the present invention is also a vulcanized product obtained by vulcanizing said vulcanizable elastomer composition. This vulcanized product may, for example, be tire treads or tire sidewalls.

For a better understanding of the present invention and for putting it into practice the following are some illustrative but not limiting examples of it.

EXAMPLES

The following characterization and analysis techniques were used.

$^{13}$C-NMR Analysis—Study of Degree of Randomization, Determination of the Content of Cis-1,4 Units and of the Content of Bound Butadiene and Isoprene The signals relating to the butadiene and isoprene dyads (II; IB+BI; BB) can be attributed through $^{13}$C-NMR analysis, as described, for example, in Lobach M. I. et al., "*Polymer*" (1977), Vol. 18, Issue 11, p. 1196-1198, in random butadiene-isoprene copolymers having a high content of cis-1,4 units according to the present invention with the possibility of defining the distribution of the co-monomers along the polymer chain and of obtaining the monomer composition, also considering the microstructure of said copolymers in terms of (cis/trans)$_{1,2}$- and 1,4-butadiene units and (cis/trans)$_{3,4}$- and 1,4-isoprene units.

The abovementioned 13C-NMR analysis was carried out as follows.
Instrumentation
  BRUKER AVANCE-DPX-300 MHz spectrometer;
  Frequencies 300.13 (1H); 75.47 (13C);
  10 mm 1H/13C (Proton/Carbon) Dual "Probe" for high temperatures;
  "$^{13}$C-Frequency": 75 MHz.
Acquisition Parameters:
  Acquisition temperature: 79.85+99.85° C.;
  Number of points acquired (TD): 64;
  Size: 32;
  Line broadening (LB): 1.2 Hz;
  Spectral window (SW): 18000 Hz (240.0+0.0 ppm);
  PULPROG*: "zgig_bilev"; program based on INVGATE;
  CPDPRG2*: "waltz16_bilev"; decoupling program;
  Relaxation time (D1): 10 sec;
  Pulse angle: 90°;
  N° of scans: 6600 (s/n=>750);
  Calculation of the s/n ratio: spectral amplitude from 200+10 ppm, automatic noise calculation between 60+50 ppm, calculation of the signal from the reference peak** of 27.9+27.3 ppm;
  Data acquisition/processing program: TOPSPIN.

(*) Acquisition programme with decoupling to eliminate the NOE (Nuclear Overhauser Enhancement) effect.

(**) Peak assignment in the 13C-NMR spectrum is based on TMS (Tetramethylsilane).

Sample Preparation

For this purpose, approximately 250 mg of random butadiene-isoprene copolymer having a high content of cis-1,4 units to be analyzed, were dissolved in 2 ml of 1,1,2,2-tetrachloroethane-d2 (99.5% deuterated solvent-Aldrich), from which oxygen was previously removed by bubbling nitrogen at reduced pressure (about 15 minutes per 2 ml of 1,1,2,2-tetrachloroethane-d2) in a 10 mm calibrated glass NMR tube (~12.5% w/v). The solution obtained was kept in a controlled temperature oven (80° C.-100° C.) with stirring for about 3-4 hours to eliminate the formation of concentration gradients, and in a flow of nitrogen to avoid degradation phenomena.

Spectral Assignment

Usually, for a copolymer obtained by the copolymerization of a monomer A and a monomer B, there are 4 ($2^2$) dyads: AA, AB+BA and BB.

Actually, in the case of the random butadiene-isoprene copolymer having a high content of cis-1,4 units according to the present invention, the number of dyads will be higher because the isoprene unit is not symmetrical due to the presence of methyl, and consequently the two methyls (11 and 14) have a different chemical environment: the total list of actual dyads present in said random butadiene-isoprene copolymer having a high content of cis-1,4 units is shown in Table 1.

Table 2 instead shows the assignment of peaks in the C-NMR spectrum of the random butadiene-isoprene copolymers having a high content of cis-1,4 units according to the present invention, used for quantitative analysis.

TABLE 1

(Dyads of a butadiene-isoprene copolymer)

| Isoprene dyads | I1(i4) | I1(b) | I4(b) | I4(i1) |
|---|---|---|---|---|
| Butadiene dyads | B(b) | B(i1) | B(i4) | — |

TABLE 2

(Assignment of peaks in the $^{13}$C-NMR spectrum of random butadiene-isoprene copolymers having a high content of cis-1,4 units according to the present invention)

| Signal | Description* | Integration ranges (ppm) |
|---|---|---|
| A | Olefinic $CH_2$, 1,2-butadiene units | 116 + 113 |
| B | Aliphatic $CH_2$, trans-1,4-butadiene units | 32.74 + 32.64 |
| 1 | $I_1(i_4)$ dyad | 32.64 + 32.38 |
| 2 | I1(b) dyad | 32.38 + 31.95 |
| 3 | I4(b) dyad | 28.68 + 28.08 |
| 4 | B(i1) dyad | 28.08 + 27.82 |
| C, 5 | B(b) dyad and aliphatic $CH_2$, 1,2-butadiene units | 27.82 + 27.10 |
| 6 | I4(i1) dyad | 26.90 + 26.42 |
| 7 | B(i4) dyad | 26.42 + 25.78 |
| D | $CH_3$ cis-1,4-isoprene units | 23.79 + 22.95 |
| E | $CH_3$ 3,4-isoprene units | 19.53 + 19.15 |
| F | $CH_3$ trans-1,4-isoprene units | 16.5 + 16.0 |

*tetramethylsilane (TMS) reference and 1,1,2,2-tetracloroethane-d2 solvent (99.5% deuterated solvent).

Determination of Randomization Index (R.I.)

The Randomization Index (R.I.) was determined as follows.

Given the equivalence of the following dyads:

I1(i4)=I4(i1); I1(b)=I4(b); B(i1)=B(i4)

there is a simplification for calculating the distribution of dyads, which may be summarized as follows:

II=I1(i4)/DEN with the I1(i4) integral of signal 1;

BI+IB=[I1(b)+I4(b)]/DEN with the I1(b) and I4(b) integrals respectively of signals 2 and 3;

BB=[B(b)×0.5]/DEN with the B(b) integral of signal 5;

in which:

II and BB are the dyads formed by two identical monomer units (in this case isoprene and butadiene, respectively);

BI and IB are the dyads formed by two different monomer units (in this case butadiene and isoprene, and isoprene and butadiene, respectively);

DEN=[I1(i4)+I1(b)+I4(b)+B(b)*0.5].

In random butadiene-isoprene copolymers having a high content of cis-1,4 units according to the present invention there is a higher concentration of (IB+BI) dyads that can be used to evaluate the degree of randomization of the chain, while in block copolymers the percentage of (IB+BI) dyads decreases and there is an increase in the percentage of II and BB sequences, which dominate.

A Randomization index (R.I.) for the isoprene monomer is then defined according to the following equation:

$$R.I.=[(BI+IB)/2]/\text{total moles of bound isoprene}$$

BI and IB have the same meanings as reported above.

In the case of the random butadiene-isoprene copolymer having a high content of cis-1,4 units according to the present invention the Randomization Index, as reported above, is between 0.5 and 1.

Determination of Monomer Composition by Dyads

The monomer composition, in terms of total butadiene and isoprene units, in the random butadiene-isoprene copolymers having a high content of cis-1,4 units according to the present invention in question was obtained according to the following mathematical relationships:

$$[PIs]\% \text{ mol}=II+0.5*(IB+BI)$$

$$[PBu]\% \text{ mol}=BB+0.5*(IB+BI)$$

in which: PIs is polyisoprene; PBu is polybutadiene; II, BI, IB and BB, have the same meanings as above.

Taking into account the molecular weight of each monomer unit it is possible to obtain the composition in terms of % by weight.

Determination of the Isomer Configuration of Chain-Bound Monomers

Through the identification and integration of the characteristic signals of the (cis and trans)$_{1,4}$- and 1,2-butadiene units and of the (cis and trans)$_{1,4}$- and 3,4-isoprene units, it is possible to obtain the isomer ratios for both polybutadiene and polyisoprene according to the following equations.

Polybutadiene:

$f_{P1,2-Bu}=I_A/(I_A+I_B+I_C)$;

1,2-butadiene units=$f_{P1,2-Bu}*PBu_{tot}$;

$f_{Pcis-1,4-Bu}=I_B/(I_A+I_B+I_C)$;

cis-1,4-butadiene units=$f_{Pcis-1,4-Bu}*PBu_{tot}$;

$f_{Ptrans-1,4-Bu}=I_C/(I_A+I_B+I_C)$;

trans-1,4-butadiene units=$f_{Ptrans-1,4-Bu}*PBu_{tot}$;

in which:
$f_{PBui}$=molar fraction of the i-th isomer unit;
$I_A$=Integral relating to the signal of the 1,2-butadiene units;
$I_B$=integral relating to the signal of the cis-1,4-butadiene units;
$I_C$=integral relating to the signal of the trans-1,4-butadiene units;
$PBU_{tot}$=total molar percentage calculated from the dyads.
Polyisoprene:
$f_{P3,4-Is}=I_E/(I_D+I_E+I_F)$;
3,4-isoprene units=$f_{P3,4-Is}*PIS_{tot}$;
$f_{Pcis-1,4-Bu}=I_D/(I_D+I_E+I_F)$;
cis-1,4-butadiene units=$f_{Pcis\ 1,4-Is}*PIS_{tot}$;
$f_{Ptrans-1,4-Is}=I_F/(I_D+I_E+I_F)$;
trans-1,4-isoprene units=$f_{Ptrans-1,4-Is}*PIS_{tot}$;
in which:
$f_{PIs\ i}$=molar fraction of the i-th isomer unit;
$I_D$=integral relative to the signal of the cis-1,4-isoprene units;
$I_E$=integral relative to the signal of the 3,4-isoprene units;
$I_F$=integral relative to the signal of the trans-1,4-isoprene units;
$PIS_{tot}$=total molar percentage calculated from the dyads.

Taking into account the molecular weight of each monomer unit it is possible to obtain each isomer composition in terms of % by weight.

Determination of Molecular Weight Distribution (MWD)

The molecular weight distribution (MWD) of the random butadiene-isoprene copolymers having a high content of cis-1,4 units according to the present invention, from which the polydispersion index corresponding to the ratio between the weight average molecular weight ($M_w$) and the numerical average molecular weight ($M_n$) is also obtained (i.e. the $M_w/M_n$ ratio), was determined by gel permeation chromatography analysis (GPC), conveniently carried out according to standard method ISO 11344:2004, IDT ("Rubber, raw, synthetic-Determination of the molecular-mass distribution of solution polymers by gel permeation chromatography"), using polystyrene as standard and applying the universal calibration method.

Mooney Viscosity

Mooney viscosity (ML1+4@100° C.) was determined according to ASTM D1646. In particular, the viscosity of the random butadiene-isoprene copolymers having a high content of cis-1,4 units according to the present invention was measured at 100° C., with a wide rotor (L), preheating for 1 minute and measuring for 4 minutes.

Thermal Analysis (DSC): Determination of the Glass Transition Temperature (Tg)

Thermal analysis (DSC) ("Differential Scanning calorimetry") to determine the glass transition temperature (Tg) of the random butadiene-isoprene copolymers having a high content of cis-1,4 units according to the present invention, was carried out using a DSC Q1000 differential scanning calorimeter from TA Instruments.

The following thermal cycle was applied to the samples for this purpose (T=temperature; v=scanning speed):
cooling of the sample from T=+25° C. to T=−130° C. at v=200° C./min;
conditioning of the sample from T=−130° C.;
subsequent heating from T=−130° C. to T=+100° C. at v=10° C./min (standard scan) (1st cycle);
cooling of the sample from T=+100° C. to T=−130° C. at v=200° C./min;
conditioning of the sample by T=−130° C.;
subsequent heating from T=−130° C. to T=+100° C. at v=10° C./min (standard scan) (2nd cycle).

The glass transition temperature (Tg) was calculated on the 2nd cycle so as to reset any thermal history of the sample through the first standard scan (1st cycle).

Example 1 (Invention)

Preparation of Random Butadiene-Isoprene Copolymer (in a Batch Reactor) 450 g of anhydrous hydrocarbon solvent comprising a mixture of hexanes (a mixture comprising 35% by weight with respect to the total weight of the mixture of n-hexane and 65% by weight with respect to the total weight of the mixture of a mixture comprising n-hexane isomers, aliphatic compounds and cycloaliphatic compounds from Cepsa) were loaded into a 1 litre reactor with stirrer and cooling system and heated to 60° C. Subsequently, 45 g of anhydrous 1,3-butadiene (from Versalis S.p.A.), 5 g of anhydrous isoprene (from Versalis S.p.A.) (% by weight butadiene: isoprene=90:10), 0.658 ml (0.625 mmol) of a 0.95 M solution of di-isobutyl aluminum hydride (DIBAH) (from Akzo Nobel) in n-hexane (from Aldrich) (molar ratio DIBAH/Nd=5), 0.665 ml (0.375 mmol) of a 0.564 M solution of diethyl aluminum chloride (DEAC) (Al/Cl molar ratio=1; from Albemarle) in n-hexane (from Albemarle) (molar ratio Cl/Nd=3) were added to said solvent, in that order, and the whole was kept, under stirring, at 60° C., for 25 minutes. Subsequently, 0.24 ml (0.125 mmol) of a 0.514 M solution of neodymium versatate [Nd(versatate)$_3$] [2.5 mmol Nd per 1000 g of monomers (1,3-butadiene+isoprene)] with a free molar acid/Nd ratio of 0.3 and a molar $H_2O$/Nd ratio of 0.018 (from Rhodia) in n-hexane (from Aldrich), was added: the whole was kept, under stirring, for 90 minutes. After 90 minutes the reaction was considered complete and was interrupted. The polymer solution was extracted from the reactor and a phenolic antioxidant (Irganox® 1520 from Ciba, in an amount of 0.1% by weight with respect to the total weight of the copolymer obtained) was added. The polymer solution obtained was then fed to a vessel containing boiling water through the introduction of steam, and subjected to stirring: in this way the residual reaction solvent was eliminated, yielding a coagulum. Said coagulum was first pressed in a cold calender and then dried completely in a calender with rollers at 80° C. to obtain a random butadiene-isoprene copolymer.

The random butadiene-isoprene copolymer obtained underwent the characterizations mentioned above: the data obtained are shown in Table 3.

Example 2 (Invention)

Preparation of Random Butadiene-Isoprene Copolymer (in a Batch Reactor)

Example 2 was carried out in the same way as Example 1 with the only difference that 35 g of anhydrous 1,3-butadiene (from Versalis S.p.A.) and 15 g of anhydrous isoprene (from Versalis S.p.A.) (% by weight butadiene: isoprene=70:30) were used.

The random butadiene-isoprene copolymer obtained underwent the characterizations mentioned above: the data obtained are shown in Table 3.

Example 3 (Invention)

Preparation of Random Butadiene-Isoprene Copolymer (in a Batch Reactor)

Example 3 was carried out in the same way as Example 1 with the only difference that 25 g of anhydrous 1,3-butadiene (from Versalis S.p.A.) and 25 g of anhydrous isoprene (from Versalis S.p.A.) (% by weight butadiene: isoprene=50:50) were used.

The random butadiene-isoprene copolymer obtained underwent the characterizations mentioned above: the data obtained are shown in Table 3.

Example 4 (Invention)

Preparation of Random Butadiene-Isoprene Copolymer (in a Batch Reactor)

450 g of anhydrous hydrocarbon solvent comprising a mixture of hexanes (a mixture comprising 35% by weight with respect to the total weight of the mixture of n-hexane and 65% by weight with respect to the total weight of the mixture of a mixture comprising n-hexane isomers, aliphatic compounds and cycloaliphatic compounds from Cepsa) were loaded into a 1 litre reactor with stirrer and cooling system and heated to 60° C. Subsequently, 35 g of anhydrous 1,3-butadiene (from Versalis S.p.A.), 15 g of anhydrous isoprene (from Versalis S.p.A.) (% by weight butadiene: isoprene=70:30), 0.658 ml (0.625 mmol) of a 0.12 M solution of di-isobutyl aluminum hydride (DIBAH) (from Akzo Nobel) in n-hexane (from Aldrich) (molar ratio DIBAH/Nd=5), 0.887 ml (0.5 mmol) of a 0.564 M solution of diethyl aluminum chloride (DEAC) (Al/Cl molar ratio=1; from Albemarle) in n-hexane (from Aldrich) (molar ratio Cl/Nd=4) were added to said solvent, in that order, and the whole was kept, under stirring, at 60° C., for 25 minutes. Subsequently, 0.24 ml (0.125 mmol) of a 0.514 M solution of neodymium versatate [Nd(versatate)$_3$] [2.5 mmol Nd per 1000 g of monomers (1,3-butadiene+isoprene)] with a free molar acid/Nd ratio of 0.3 and a molar H$_2$O/Nd ratio of 0.018 (from Rhodia) in n hexane (from Aldrich), was added: the whole was kept, under stirring, for 90 minutes. After 90 minutes the reaction was considered complete and was interrupted. The polymer solution was extracted from the reactor and a phenolic antioxidant (Irganox® 1520 from Ciba, in an amount of 0.1% by weight with respect to the total weight of the copolymer obtained) was added. The polymer solution obtained was then fed to a vessel containing boling water through the introduction of steam, and subjected to stirring: in this way the residual reaction solvent was eliminated, yielding a coagulum. Said coagulum was first pressed in a cold calender and then dried completely in a calender with rollers at 80° C. to obtain a random butadiene-isoprene copolymer.

The random butadiene-isoprene copolymer obtained underwent the characterizations mentioned above: the data obtained are shown in Table 3.

Example 5 (Invention)

Preparation of Random Butadiene-Isoprene Copolymer (in a Batch Reactor)

Example 5 was carried out in the same way as Example 4 with the only difference that 1.11 ml (0.625 mmol) of a 0.564 M solution of diethyl aluminum chloride (DEAC) (Al/Cl molar ratio=1; from Albemarle) in n-hexane (from Aldrich) (molar ratio Cl/Nd=5) was used.

The random butadiene-isoprene copolymer obtained underwent the characterizations mentioned above: the data obtained are shown in Table 3.

Example 6 (Comparative)

Preparation of Random Butadiene-Isoprene Copolymer (in a Batch Reactor)

Example 6 was carried out in the same way as Example 4 with the only difference that 0.443 ml (0.25 mmol) of a 0.564 M solution of diethyl aluminum chloride (DEAC) (Al/Cl molar ratio=1; from Albemarle) in n-hexane (from Aldrich) (molar ratio Cl/Nd=2) was used.

The random butadiene-isoprene copolymer obtained underwent the characterizations mentioned above: the data obtained are shown in Table 3.

Example 7 (Comparative)

Preparation of Random Butadiene-Isoprene Copolymer (in a Batch Reactor)

Example 7 was carried out in the same way as Example 4 with the only difference that 1.33 ml (0.75 mmol) of a 0.564 M solution of diethyl aluminum chloride (DEAC) (Al/Cl molar ratio=1; from Albemarle) in n-hexane (from Aldrich) (molar ratio Cl/Nd=6) was used.

The random butadiene-isoprene copolymer obtained underwent the characterizations mentioned above: the data obtained are shown in Table 3.

Example 8 (Comparative)

Preparation of Random Butadiene-Isoprene Copolymer (in a Batch Reactor)

Example 8 was carried out in the same way as Example 4 with the only difference that 1.55 ml (0.875 mmol) of a 0.564 M solution of diethyl aluminum chloride (DEAC) (Al/Cl molar ratio=1; from Albemarle) in n-hexane (from Aldrich) (molar ratio Cl/Nd=7) was used.

The random butadiene-isoprene copolymer obtained underwent the characterizations mentioned above: the data obtained are shown in Table 3.

Example 9 (Invention)

Preparation of Random Butadiene-Isoprene Copolymer (in a Batch Reactor)

450 g of anhydrous hydrocarbon solvent comprising a mixture of hexanes (a mixture comprising 35% by weight with respect to the total weight of the mixture of n-hexane and 65% by weight with respect to the total weight of the mixture of a mixture comprising n-hexane isomers, aliphatic compounds and cycloaliphatic compounds from Cepsa) were loaded into a 1 litre reactor with stirrer and cooling system and heated to 60° C.

Subsequently, 35 g of anhydrous 1,3-butadiene (from Versalis S.p.A.), 15 g of anhydrous isoprene (from Versalis S.p.A.) (% by weight butadiene: isoprene=90:10), 0.526 ml (0.5 mmol) of a 0.95 M solution of di isobutyl aluminum hydride (DIBAH) (from Akzo Nobel) in n-hexane (from Aldrich) (molar ratio DIBAH/Nd=4), 1.11 ml (0.625 mmol) of a 0.564 M solution of diethyl aluminum chloride (DEAC) (Al/Cl molar ratio=1; from Albemarle) in n-hexane (from Aldrich) (molar ratio Cl/Nd=5) were added to said solvent, in that order, and the whole was kept, under stirring, at 60°, for 25 minutes. Subsequently, 0.24 ml (0.125 mmol) of a 0.514 M solution of neodymium versatate [Nd(versatate)$_3$]

[2.5 mmol Nd per 1000 g of monomers (1,3-butadiene+ isoprene)] with a free molar acid/Nd ratio of 0.3 and a molar H₂O/Nd ratio of 0.018 (from Rhodia) in n-hexane (from Aldrich), was added: the whole was kept, under stirring, for 90 minutes. After 90 minutes, the reaction was considered complete and was interrupted. The polymer solution was extracted from the reactor and a phenolic antioxidant (Irganox® 1520 from Ciba, in an amount of 0.1% by weight with respect to the total weight of the copolymer obtained) was added. The polymer solution obtained was then fed to a vessel containing boiling water through the introduction of steam, and subjected to stirring: in this way the residual reaction solvent was eliminated, yielding a coagulum. Said coagulum was first pressed in a cold calender and then dried completely in a calender with rollers at 80° C. to obtain a random butadiene-isoprene copolymer.

The random butadiene-isoprene copolymer obtained underwent the characterizations mentioned above: the data obtained are shown in Table 3.

Example 10 (Comparative)

Preparation of Random Butadiene-Isoprene Copolymer (in a Batch Reactor)

450 g of anhydrous hydrocarbon solvent comprising a mixture of hexanes (a mixture comprising 35% by weight with respect to the total weight of the mixture of n-hexane and 65% by weight with respect to the total weight of the mixture of a mixture comprising n-hexane isomers, aliphatic compounds and cycloaliphatic compounds from Cepsa) were loaded into a 1 litre reactor with stirrer and cooling system and heated to 60° C. Subsequently 35 g of anhydrous 1,3-butadiene (from Versalis S.p.A.), 15 g of anhydrous isoprene (from Versalis S.p.A.) (% by weight butadiene: isoprene=90:10), 0.526 ml (0.5 mmol) of a 0.95 M solution of di isobutyl aluminum hydride (DIBAH) (from Akzo Nobel) in n-hexane (from Aldrich) (molar ratio DIBAH/ Nd=4), 0.443 ml (0.25 mmol) of a 0.564 M solution of diethyl aluminum chloride (DEAC) (Al/Cl molar ratio=1; from Albemarle) in n-hexane (from Aldrich) (molar ratio Cl/Nd=2) were added to said solvent, in that order, and the whole was kept, under stirring, at 60° C., for 25 minutes. Subsequently, 0.24 ml (0.125 mmol) of a 0.514 M solution of neodymium versatate [Nd(versatate)₃] with a free versatic acid/Nd molar ratio of 0.3 and a molar H₂O/Nd ratio of 0.018 (from Rhodia) in n-hexane (from Aldrich) [2.5 mmol Nd per 1000 g of monomers (1,3-butadiene+isoprene)], was added: the whole was kept, under stirring, for 90 minutes. After 90 minutes the reaction was considered complete and was interrupted. The polymer solution was extracted from the reactor and a phenolic antioxidant (Irganox® 1520 from Ciba, in an amount of 0.1% by weight with respect to the total weight of the copolymer obtained) was added. The polymer solution obtained was then fed to a vessel containing boiling water through the introduction of steam, and subjected to stirring: in this way the residual reaction solvent was eliminated, yielding a coagulum. Said coagulum was first pressed in a cold calender and then dried completely in a calender with rollers at 80° C. to obtain a random butadiene-isoprene copolymer.

The random butadiene-isoprene copolymer obtained underwent the characterizations mentioned above: the data obtained are shown in Table 3.

Example 11 (Invention)

Preparation of Random Butadiene-Isoprene Copolymer (Continuous)

Anhydrous 1,3-butadiene (from Versalis S.p.A.), anhydrous isoprene (from Versalis S.p.A.) and anhydrous hydrocarbon solvent comprising a mixture of hexanes (a mixture comprising 35% by weight with respect to to the total weight of the mixture of n-hexane and 65% by weight with respect to the total weight of the mixture of a mixture comprising n-hexane isomers, aliphatic compounds and cycloaliphatic compounds from Cepsa) were fed to a plant comprising three reactors in series including a primary reactor of 100 l, a secondary reactor of 100 l and a tertiary reactor of 45 l equipped with wall-scraping stirrers, distilled and further dried by passing through a bed of 3A molecular sieves, in such ratios that the total concentration of the monomers was equal to 13% by weight with respect to the total weight of the mixture and the hourly amount of butadiene+isoprene was equal to 6 kg/hour with a butadiene: isoprene weight ratio of 90:10: the temperature of the monomer and solvent mixture obtained was set at a value not exceeding 22° C. and in any event such as to regulate (together with the amount of steam circulating in the jackets with which the reactors were provided) a synthesis temperature at the bottom of the primary reactor which was constant and centred on a value of 60° C. In the same feed line, a 0.0921 M solution of di-isobutyl aluminum hydride (DIBAH) (from Akzo Nobel) in n-hexane (from Aldrich) (DIBAH/Nd molar ratio=4), a 1 M solution of diethyl aluminum chloride (DEAC) (Al/Cl molar ratio=1; from Albemarle) in n-hexane (from Aldrich) (Cl/Nd molar ratio=4.3), while the 0.0248 M solution of neodymium versatate [Nd(versatate)₃] having a free versatic acid to Nd molar ratio of 0.3 and a molar H₂O/Nd ratio of 0.014 (from Rhodia) in n-hexane (from Aldrich) [2.5 mmoles of Nd per 1000 g of monomers (1,3-butadiene+isoprene)] was separately fed directly into the primary reactor. After the addition of demineralized water and a phenolic antioxidant (Irganox® 1520 from Ciba, 0.1% by weight with respect to the total weight of the polymer solution), the polymer solution from the last polymerization reactor was transferred and stored in stirred blenders. Subsequently, the polymer solution was fed from said blenders to a stripper to remove residual reaction solvent and the random, butadiene-isoprene copolymer discharged from the bottom of the stripper underwent a drying stage in an extruder. The random butadiene-isoprene copolymer obtained underwent the characterizations mentioned above: the data obtained are shown in Table 3.

Example 12 (Invention)

Preparation of Random Butadiene-Isoprene Copolymer (Continuous)

Anhydrous 1,3-butadiene (from Versalis S.p.A.), anhydrous isoprene (from Versalis S.p.A.) and anhydrous hydrocarbon solvent comprising a mixture of hexanes (a mixture comprising 35% by weight of with respect to the total weight of the mixture of n-hexane and 65% by weight with respect to the total weight of the mixture of a mixture comprising n-hexane isomers, aliphatic compounds and cycloaliphatic compounds from Cepsa) were fed to a plant comprising three reactors in series including a primary reactor of 100 l, a secondary reactor of 100 l and a tertiary reactor of 45 l equipped with wall-scraping stirrers, distilled and further dried by passing through a bed of 3A molecular sieves, in such ratios that the total concentration of the monomers was equal to 13% by weight with respect to the total weight of the mixture and the hourly amount of butadiene+isoprene was equal to 6 kg/hour with a butadiene: isoprene weight ratio of 70:30: the temperature of the monomer and solvent mixture obtained was set at a value not exceeding 22° C. and in any event such as to regulate (together with the amount of steam circulating in the jackets with which the reactors were provided) a synthesis temperature at the bottom of the primary reactor, which was constant and centred on a value of 60° C. In the same feed line a 0.0921 M solution of di-isobutyl aluminum hydride (DIBAH) (from Akzo Nobel) in n-hexane (from Aldrich) (DIBAH/Nd molar ratio=4), a 0.119 M solution of diethyl aluminum chloride (DEAC) (Al/Cl molar ratio=1; from Albemarle) in n-hexane (from Aldrich) (Cl/Nd molar ratio=4.3), while the 0.0248 M solution of neodymium versatate [Nd(versatate)$_3$] having a free versatic acid to Nd molar ratio of 0.3 and a molar $H_2O$/Nd ratio of 0.014 (from Rhodia) in n-hexane (from Aldrich) [2.5 mmoles of Nd per 1000 g of monomers (1,3-butadiene+isoprene)] was separately fed directly into the primary reactor. After the addition of demineralized water and a phenolic antioxidant (Irganox® 1520 from Ciba, 0.1% by weight with respect to the total weight of the polymer solution), the polymer solution from the last polymerization reactor was transferred and stored in stirred blenders. Subsequently, the polymer solution was fed from said blenders to a stripper to remove residual reaction solvent and the random butadiene-isoprene copolymer discharged from the bottom of the stripper underwent a drying stage in an extruder.

The random butadiene-isoprene copolymer obtained underwent the characterizations mentioned above: the data obtained are shown in Table 3.

Example 13 (Invention)

Preparation of Butadiene-Isoprene Copolymer (Continuous)

Anhydrous 1,3-butadiene (from Versalis S.p.A.), anhydrous isoprene (from Versalis S.p.A.) and anhydrous hydrocarbon solvent comprising a mixture of hexanes (a mixture comprising 35% by weight with respect to the total weight of the mixture of n-hexane and 65% by weight with respect to the total weight of the mixture of a mixture comprising n-hexane isomers, aliphatic compounds and cycloaliphatic compounds from Cepsa) were fed to a plant comprising three reactors in series including a primary reactor of 100 l, a secondary reactor of 100 l and a tertiary reactor of 45 l equipped with wall-scraping stirrers, distilled and further dried by passing through a bed of 3A molecular sieves, in such ratios that the total concentration of the monomers was equal to 13% by weight with respect to the total weight of the mixture and the hourly amount of butadiene+isoprene was equal to 6 kg/hour with a butadiene: isoprene weight ratio of 50:50: the temperature of the monomer and solvent mixture obtained was set at a value not exceeding 22° C. and in any event such as to regulate (together with the amount of steam circulating in the jackets with which the reactors were provided) a synthesis temperature at the bottom of the primary reactor, which was constant and centred on a value of 60° C. In the same feed line, a 0.0921 M solution of di-isobutyl aluminum hydride (DIBAH) (from Akzo Nobel) in n-hexane (from Aldrich) (DIBAH/Nd molar ratio=4), a 0.119 M solution of diethyl aluminum chloride (DEAC) (Al/Cl molar ratio=1; from Albemarle) in n-hexane (from Aldrich) (Cl/Nd molar ratio=4.3), while the 0.0248 M solution of neodymium versatate [Nd(versatate)$_3$] having a free versatic acid to Nd molar ratio of 0.3 and a molar $H_2O$/Nd ratio of 0.014 (from Rhodia) in n-hexane (from Aldrich) [2.5 mmoles of Nd per 1000 g of monomers (1,3-butadiene+isoprene)] was separately fed directly into the primary reactor. The polymer solution from the last polymerization reactor, after the addition of demineralized water and a phenolic antioxidant (Irganox® 1520 from Ciba, 0.1% by weight with respect to the total weight of the polymer solution), was transferred and stored in stirred blenders. Subsequently, the polymer solution was fed from said blenders to a stripper to remove residual reaction solvent and the random butadiene-isoprene copolymer discharged from the bottom of the stripper underwent a drying stage in an extruder.

The random butadiene-isoprene copolymer obtained underwent the characterizations mentioned above: the data obtained are shown in Table 3.

Example 14 (Comparative)

Preparation of Butadiene-Isoprene Copolymer (Continuous)

Anhydrous 1,3-butadiene (from Versalis S.p.A.), anhydrous isoprene (from Versalis S.p.A.) and anhydrous hydrocarbon solvent comprising a mixture of hexanes (a mixture comprising 35% by weight with respect to the total weight of the mixture of n-hexane and 65% by weight with respect to the total weight of the mixture of a mixture comprising n-hexane isomers, aliphatic compounds and cycloaliphatic compounds from Cepsa) were fed to a plant comprising three reactors in series including a primary reactor of 100 l, a secondary reactor of 100 l and a tertiary reactor of 45 l equipped with wall-scraping stirrers, distilled and further dried by passing through a bed of 3A molecular sieves, in such ratios that the total concentration of the monomers was equal to 13% by weight with respect to the total weight of the mixture and the hourly amount of butadiene+isoprene was equal to 6 kg/hour with a butadiene: isoprene weight ratio of 70:30: the temperature of the monomer and solvent mixture obtained was set at a value not exceeding 22° C. and in any event such as to regulate (together with the amount of steam circulating in the jackets with which the reactors were provided) a synthesis temperature at the bottom of the primary reactor, which was constant and centred on a value of 60° C. In the same feed line, a 0.0921 M solution of di-isobutyl aluminum hydride (DIBAH) (from Akzo Nobel) in n-hexane (from Aldrich) (DIBAH/Nd molar ratio=4), a 0.119 M solution of diethyl aluminum chloride (DEAC) (Al/Cl molar ratio=1; from Albemarle) in n-hexane (from Aldrich) (Cl/Nd molar ratio=4.3), while the 0.0248 M solution of neodymium versatate [Nd(versatate)$_3$] having a free versatic acid to Nd molar ratio of 0.3 and a molar $H_2O$/Nd ratio of 0.014 (from Rhodia) in n-hexane (from Aldrich) [2.5 mmoles of Nd per 1000 g of monomers (1,3-butadiene+isoprene)] was separately fed directly into the primary reactor. After the addition of demineralized water and a phenolic antioxidant (Irganox® 1520 from Ciba, 0.1% by weight with respect to the total weight of the polymer solution), the polymer solution from the last polymerization reactor was transferred and stored in stirred blenders. Subsequently, the polymer solution was fed from said blenders to a stripper to remove residual reaction solvent and the random butadiene-isoprene copolymer discharged from the bottom of the stripper underwent a drying stage in an extruder.

The random butadiene-isoprene copolymer obtained underwent the characterizations mentioned above: the data obtained are shown in Table 3.

TABLE 3

| EXAMPLE | Nd/monomers[1] (mmol/Kg) | DIBAH/Nd[2] (mol/mol) | Cl/Nd[3] (mol/mol) | Cl/DIBAH[4] (mol/mol) | Bound butadiene (% by weight) | Bound isoprene (% by weight) | Bound butadiene (% mol) | Bound butadiene (% mol) | $M_n$ (kdalton) |
|---|---|---|---|---|---|---|---|---|---|
| 1 (invention) | 2.5 | 5 | 3 | 0.6 | 90.1 | 9.9 | 92.0 | 8.0 | 126 |
| 2 (invention) | 2.5 | 5 | 3 | 0.6 | 70.2 | 29.8 | 74.8 | 25.2 | 147 |
| 3 (invention) | 2.5 | 5 | 3 | 0.6 | 50.1 | 49.9 | 55.8 | 44.2 | 157 |
| 4 (invention) | 2.5 | 5 | 4 | 0.8 | 69.9 | 30.1 | 74.5 | 25.5 | 135 |
| 5 (invention) | 2.5 | 5 | 5 | 1 | 69.9 | 30.1 | 74.5 | 25.5 | 139 |
| 6 (comparative) | 2.5 | 5 | 2 | 0.4 | 70.0 | 30.0 | 74.6 | 25.4 | 117 |
| 7 (comparative) | 2.5 | 5 | 6 | 1.2 | 70.1 | 29.9 | 74.7 | 25.3 | 101 |
| 8 (comparative) | 2.5 | 5 | 7 | 1.4 | 70.2 | 29.8 | 74.8 | 25.2 | 94 |
| 9 (invention) | 2.5 | 4 | 5 | 1.25 | 70.1 | 29.9 | 74.7 | 25.3 | 147 |
| 10 (comparative) | 2.5 | 4 | 2 | 0.5 | 70.2 | 29.8 | 74.8 | 25.2 | 127 |
| 11 (invention) | 2.5 | 4 | 4.3 | 1.075 | 89.9 | 10.1 | 91.8 | 8.2 | 135 |
| 12 (invention) | 2.5 | 4 | 4.3 | 1.075 | 70.1 | 29.9 | 74.7 | 25.3 | 143 |
| 13 (invention) | 2.5 | 4 | 4.3 | 1.075 | 50.1 | 48.9 | 55.8 | 44.2 | 152 |
| 14 (comparative) | 2.5 | 4 | 6 | 1.5 | 69.9 | 30.1 | 64.5 | 25.5 | 108 |

| EXAMPLE | $M_w$ (kdalton) | $M_w/M_n$ | Mooney Viscosity (ML1 + 4@100° C.) | II[5] (% mol) | BI + IB[6] (% mol) | BB[7] (% mol) | R.I.[8] (mol/mol) | $T_g$[9] (°C.) | cis-1,4-butadiene (% by weight) | cis-1,4-isoprene (% by weight) |
|---|---|---|---|---|---|---|---|---|---|---|
| 1 (invention) | 369 | 2.9 | 43 | 0.5 | 13.6 | 85.9 | 0.85 | −104.3 | 98.6 | 99.9 |
| 2 (invention) | 390 | 2.7 | 44 | 6.4 | 36.0 | 57.6 | 0.71 | −96.8 | 98.8 | 98.9 |
| 3 (invention) | 466 | 3.0 | 47 | 19.3 | 49.8 | 30.9 | 0.56 | −87.9 | 97.0 | 98.8 |
| 4 (invention) | 375 | 2.8 | 42 | 6.4 | 36.5 | 57.1 | 0.72 | −96.5 | 98.8 | 98.9 |
| 5 (invention) | 365 | 2.6 | 41 | 6.3 | 36.4 | 57.3 | 0.71 | −96.4 | 98.7 | 98.8 |
| 6 (comparative) | 396 | 3.4 | 47 | 6.3 | 36.7 | 57.0 | 0.72 | −96.5 | 98.5 | 98.5 |
| 7 (comparative) | 360 | 3.6 | 39 | 6.4 | 36.0 | 57.6 | 0.71 | −96.9 | 98.8 | 98.9 |
| 8 (comparative) | 363 | 3.9 | 40 | 6.5 | 36.1 | 57.4 | 0.72 | −96.8 | 98.5 | 98.6 |
| 9 (invention) | 410 | 2.8 | 47 | 6.4 | 36.5 | 57.1 | 0.72 | −96.8 | 98.8 | 99.0 |
| 10 (comparative) | 450 | 3.5 | 46 | 6.3 | 36.1 | 57.6 | 0.72 | −96.7 | 98.4 | 98.6 |
| 11 (invention) | 355 | 2.6 | 43 | 0.6 | 14.0 | 85.4 | 0.85 | −103.9 | 98.9 | 98.9 |
| 12 (invention) | 385 | 2.7 | 42 | 6.3 | 36.6 | 57.1 | 0.72 | −96.6 | 98.7 | 98.9 |
| 13 (invention) | 450 | 3.0 | 44 | 19.0 | 50.0 | 31.0 | 0.57 | −87.8 | 98.7 | 98.8 |
| 14 (comparative) | 365 | 3.4 | 41 | 6.5 | 35.0 | 58.5 | 0.69 | −96.4 | 98.4 | 98.6 |

[1]amount of neodymium versatate [Nd(versatate)₃] per 1000 g of monomers (butadiene + isoprene);
[2]molar ratio between di-isobutyl aluminum hydride (DIBAH) and neodymium versatate [Nd(versatate)₃];
[3]molar ratio between chlorine (Cl) present in diethyl aluminum chloride (DEAC) and neodymium versatate [Nd(versatate)₃];
[4]molar ratio between chlorine (Cl) present in diethyl aluminum chloride (DEAC) and di-isobutyl aluminum hydride (DIBAH));
[5]isoprene dyads;
[6]sum of butadiene-isoprene dyads and isoprene-butadiene dyads;
[7]butadiene dyads;
[8]randomization index;
[9]glass transition temperature

The invention claimed is:
1. A process for the preparation of a random butadiene-isoprene copolymer having a high content of cis-1,4 units comprising copolymerizing butadiene and isoprene in the presence of at least one organic solvent and of a catalytic system prepared in situ comprising:
- ($a_1$) at least one neodymium carboxylate which is soluble in the organic solvent, containing a variable amount of water, the $H_2O/Nd$ molar ratio being between 0.001/1 and 0.50/1;
- ($a_2$) at least one aluminum alkyl compound; and
- ($a_3$) at least one aluminum alkyl compound containing at least one halogen atom, wherein the molar ratio between the halogen present in the at least one aluminum alkyl compound containing at least one halogen atom ($a_3$) and the neodymium carboxylate ($a_1$) is between 2.5/1 and 5.5/1, wherein the aluminum alkyl compound containing at least one halogen atom ($a_3$) is used in such an amount that the molar ratio between the halogen present in the aluminum alky compound ($a_3$) and the aluminum alkyl compound ($a_2$) is between 0.4 and 5, and wherein the random butadiene-isoprene copolymer has a molecular weight distribution, indicated as a polydispersion index corresponding to the ratio between the weight average molecular weight ($M_w$) and the number average molecular weight ($M_n$) (i.e. the ratio $M_w/M_n$) of between 2.0 and 3.2.

2. The process for the preparation of a random butadiene-isoprene copolymer having a high content of cis-1,4 units according to claim 1, in which the butadiene and the isoprene are present in a total amount (i.e. butadiene amount+isoprene amount) between 5% by weight and 40% by weight with respect to the total weight of the organic solvent.

3. The process for the preparation of a random butadiene-isoprene copolymer having a high content of cis-1,4 units according to claim 1, in which the organic solvent is selected from: saturated aliphatic hydrocarbons selected from the group consisting of butane, n-pentane, n-hexane, n-heptane, and mixtures thereof; saturated cycloaliphatic hydrocarbons selected from the group consisting of cyclohexane, cyclopentane, and mixtures thereof; monoolefins selected from the group consisting of 1-butene, 2-butene, or mixtures thereof; halogenated hydrocarbons selected from the group consisting of methylene chloride, chloroform, carbon tetrachloride, trichlorethylene, perchlorethylene, 1,2-dichloroethane, chlorobenzene, bromobenzene, and chlorotoluene.

4. The process for the preparation of a random butadiene-isoprene copolymer having a high content of cis-1,4 units according to claim 1, in which the neodymium carboxylate ($a_1$) is neodymium versatate [Nd(versatate)$_3$].

5. The process for the preparation of a random butadiene-isoprene copolymer having a high content of cis-1,4 units according to claim 1, in which the neodymium carboxylate is used in an amount of between 0.1 mmoles to 10 mmoles per 1000 g of monomers (butadiene+isoprene) being polymerized.

6. The process for the preparation of a random butadiene-isoprene copolymer having a high content of cis-1,4 units according to claim 1, in which the aluminum alkyl compound ($a_2$) is selected from compounds having general formula (I) or (II):

$$Al(R^1)_3 \quad (I)$$

$$AlH(R^1)_2 \quad (II)$$

in which $R^1$ represents a linear or branched $C_1$-$C_{10}$ alkyl group.

7. The process for the preparation of a random butadiene-isoprene copolymer having a high content of cis-1,4 units according to claim 1, in which the alkyl aluminum compound containing at least one halogen atom ($a_3$) is selected from compounds having general formula (III):

$$AlXNR^2{}_{3-n} \quad (III)$$

in which $R^2$ represents a linear or branched $C_1$-$C_{10}$ alkyl group, X represents a halogen atom selected from the group consisting of chlorine, bromine, fluorine, iodine.

8. The process for the preparation of a random butadiene-isoprene copolymer having a high content of cis-1,4 units according to claim 1, in which the molar ratio between the aluminum alkyl compound ($a_2$) and the neodymium carboxylate ($a_1$) is between 1/1 and 30/1.

9. The process for the preparation of a random butadiene-isoprene copolymer having a high content of cis-1,4 units according to claim 1, in which the process is carried out:
at a temperature of between 20° C. and 150° C. and/or
at a pressure of between 1 bar and 10 bar.

10. The process for the preparation of a random butadiene-isoprene copolymer having a high content of cis-1,4 units according to claim 2, in which the butadiene and the isoprene are present in a total amount (i.e. butadiene amount+isoprene amount) between 10% by weight and 25% by weight with respect to the total weight of the organic solvent.

11. The process for the preparation of a random butadiene-isoprene copolymer having a high content of cis-1,4 units according to claim 1, wherein the organic solvent is n-hexane.

12. The process for the preparation of a random butadiene-isoprene copolymer having a high content of cis-1,4 units according to claim 1, in which the neodymium carboxylate ($a_1$) is neodymium versatate [Nd(versatate)$_3$], wherein the neodymium versatate [Nd(versatate)$_3$] has a free versatic acid/Nd molar ratio of less than 2, wherein the neodymium carboxylate ($a_1$) is used in an amount of between 0.5 mmol and 5 mmol per 1000 g of monomers (butadiene+isoprene) being polymerized, wherein the aluminum alkyl compound ($a_2$) is selected from compounds having general formula (I) or (II):

$$Al(R^1)_3 \quad (I)$$

$$AlH(R^1)_2 \quad (II)$$

in which $R^1$ represents a linear or branched $C_1$-$C_{10}$ alkyl group, wherein the aluminum alkyl compound ($a_2$) is selected from the group consisting of triethyl aluminum (TEA), tri-isobutyl aluminum, diethyl aluminum hydride, di-isobutyl aluminum hydride (DIBAH), wherein the aluminum alkyl compound containing at least one halogen atom ($a_3$) is selected from compounds having general formula (III):

$$AlXnR^2{}_{3-n} \quad (III)$$

wherein $R^2$ represents a linear or branched $C_1$-$C_{10}$ alkyl group, wherein X is chlorine, wherein n is 1 or 2, wherein the aluminum alkyl compound containing at least one halogen atom ($a_3$) is diethyl aluminum chloride (DEAC) or ethyl aluminum sesquichloride (EASC), wherein the molar ratio between the aluminum alkyl compound ($a_2$) and the neodymium carboxylate ($a_1$) is between 1/1 and 10/1, wherein the aluminum compound containing at least one halogen atom ($a_3$) is used in such an amount that the molar ratio between the halogen present in the aluminum alkyl compound ($a_3$) and the aluminum alkyl compound ($a_2$) is between 0.5 and 2.0, in which the process is carried out:

at a temperature of between 40° C. and 120° C.; and/or at a pressure of between 3 bar and 7 bar.

13. The process for the preparation of a random butadiene-isoprene copolymer having a high content of cis-1,4 units according to claim 1, in which the neodymium carboxylate ($a_1$) is neodymium versatate [Nd(versatate)$_3$], wherein the aluminum alkyl compound ($a_2$) is selected from compounds having general formula (I) or (II):

$$Al(R^1)_3 \qquad (I)$$

$$AlH(R^1)_2 \qquad (II)$$

wherein $R^1$ represents a linear or branched $C_1$-$C_{10}$ alkyl group, wherein the aluminum alkyl compound ($a_2$) is di-isobutyl aluminum hydride (DIBAH), in which the alkyl aluminum compound containing at least one halogen atom ($a_3$) is selected from compounds having general formula (III):

$$AlX_nR^2_{3-n} \qquad (III)$$

wherein X is chlorine, $R^2$ represents a linear or branched $C_1$-$C_{10}$ alkyl group, wherein n is 1 or 2, wherein the alkyl aluminum compound containing at least one halogen atom ($a_3$) is diethyl aluminum chloride (DEAC).

* * * * *